(12) United States Patent
Do et al.

(10) Patent No.: US 11,000,832 B1
(45) Date of Patent: May 11, 2021

(54) DEHYDROGENATION CATALYST WITH MINIMIZED AROMATIC PRODUCTION

(71) Applicant: UOP LLC, Des Plaines, IL (US)

(72) Inventors: Phuong Thi Mai Do, Mount Prospect, IL (US); Wei Pan, Hoffman Estates, IL (US); Stephen Sohn, Arlington Heights, IL (US); Amanda Hickman, Des Plaines, IL (US); Tsukasa Tamai, Sagamihara (JP); Takumi Terui, Kanagawa-ken (JP); Tomoaki Mori, Kanagawa-ken (JP)

( * ) Notice: Subject to any disclaimer, the term of this patent is extended or adjusted under 35 U.S.C. 154(b) by 0 days.

(21) Appl. No.: 16/818,061

(22) Filed: Mar. 13, 2020

(51) Int. Cl.
| | |
|---|---|
| *B01J 23/56* | (2006.01) |
| *B01J 23/62* | (2006.01) |
| *B01J 35/00* | (2006.01) |
| *B01J 21/04* | (2006.01) |
| *B01J 35/10* | (2006.01) |
| *C10G 11/02* | (2006.01) |

(52) U.S. Cl.
CPC ............ *B01J 23/626* (2013.01); *B01J 21/04* (2013.01); *B01J 35/0006* (2013.01); *B01J 35/1014* (2013.01); *B01J 35/1019* (2013.01); *C10G 11/02* (2013.01); *C10G 2300/1081* (2013.01); *C10G 2300/4006* (2013.01); *C10G 2300/4012* (2013.01); *C10G 2300/4018* (2013.01); *C10G 2400/20* (2013.01); *C10G 2400/22* (2013.01)

(58) Field of Classification Search
CPC .......... B01J 23/626; B01J 23/62; B01J 23/56; B01J 37/20; B01J 23/644; B01J 21/12; B01J 37/0201; B01J 37/03; B01J 23/652; B01J 23/85; B01J 27/24; B01J 37/082
See application file for complete search history.

(56) References Cited

U.S. PATENT DOCUMENTS

| | | |
|---|---|---|
| 3,274,124 A | 9/1966 | O'Hara |
| 3,632,503 A | 1/1972 | Hayes |
| 3,682,838 A | 8/1972 | Bloch |
| 3,755,481 A | 8/1973 | Hayes |
| 3,761,531 A | 9/1973 | Bloch |
| 3,878,131 A | 4/1975 | Hayes |
| 3,909,450 A | 9/1975 | O'Hara |
| 4,440,871 A | 4/1984 | Lok et al. |
| 4,793,984 A | 12/1988 | Lok et al. |
| 4,988,659 A | 1/1991 | Pecoraro |
| 6,177,381 B1 | 1/2001 | Jensen et al. |

(Continued)

*Primary Examiner* — Sharon Pregler

(57) ABSTRACT

A catalyst composition and its use as a dehydrogenation catalyst to increase normal olefin selectivity and reduce undesirable aromatic selectivity. The reduction in aromatic production allows for the elimination of a unit to remove aromatic compounds. The catalyst has a layered composition comprising an inner core, an outer layer bonded to the inner core, the outer layer comprising one or more transition alumina with at least two diffraction angle peaks between 32.0° and 70.0° 2θ, wherein a first diffraction angle peak in that range is at 32.7±0.4° 2θ, a second diffraction angle peak is at 50.8±0.4° 2θ, and having a thickness of less than about 100 microns and having uniformly dispersed thereon said platinum catalyst and at least one promoter metal and having a concentration of the platinum catalyst of from about 0.00006 to 0.0005 gram of the platinum group metal on an elemental basis per meter square surface area of the outer layer.

14 Claims, 1 Drawing Sheet

(56) References Cited

U.S. PATENT DOCUMENTS

| | | | |
|---|---|---|---|
| 6,756,515 B2 * | 6/2004 | Rende | B01J 23/626 585/374 |
| 2019/0232255 A1 * | 8/2019 | Jo | B01J 35/0026 |

* cited by examiner

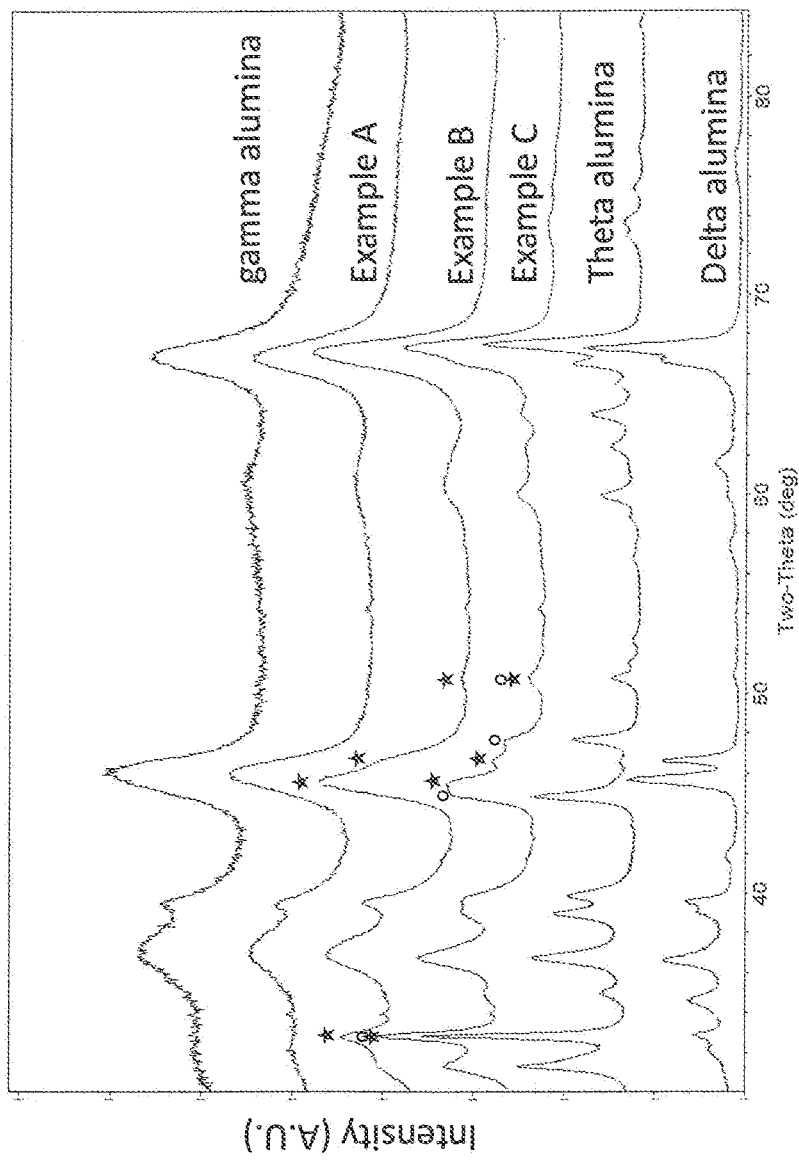

DEHYDROGENATION CATALYST WITH MINIMIZED AROMATIC PRODUCTION

This invention relates to a hydrocarbon dehydrogenation process using a layered catalyst composition at select operating conditions for increased total normal olefin selectivity and reduced undesirable aromatic selectivity.

Platinum based catalysts are used for numerous hydrocarbon conversion processes. In many applications promoters and modifiers are also used. One such hydrocarbon conversion process is the dehydrogenation of hydrocarbons, particularly alkanes such as isobutane which are converted to isobutylene. For example, U.S. Pat. No. 3,878,131 (and related U.S. Pat. Nos. 3,632,503 and 3,755,481) discloses a catalyst comprising a platinum metal, a tin oxide component and a germanium oxide component. All components are uniformly dispersed throughout the alumina support. U.S. Pat. No. 3,761,531 (and related U.S. Pat. No. 3,682,838) discloses a catalytic composite comprising a platinum group component, a Group IVA (IUPAC 14) metallic component, e.g., germanium, a Group VA (IUPAC 15) metallic component, e.g., arsenic, antimony, and an alkali or alkaline earth component all dispersed on an alumina carrier material. Again all the components are evenly distributed on the carrier.

U.S. Pat. No. 6,177,381 describes a layered catalyst composition and a process for preparing this catalyst. Example 7 of U.S. Pat. No. 6,177,381 describes testing of Catalysts A, B, E, and F for dehydrogenation activity using a hydrocarbon feed. A water concentration of 2000 ppm based on hydrocarbon weight was injected. The deactivation rates of Catalysts A, B, E, and F were 0.052, 0.032, 0.050, and 0.033° F./hr, respectively.

U.S. Pat. No. 6,756,515 describes a dehydrogenation process using a layered catalyst composition comprising an inner core such as alpha-alumina and an outer layer bonded to the inner core composed of an outer refractory inorganic oxide such as gamma-alumina. The outer layer has uniformly dispersed thereon a platinum group metal such as platinum and a promoter metal such as tin. The composition has been an effective catalyst, but it is desirable to develop a catalyst and process that improve the yield of total normal olefins and reduce the undesirable aromatic compounds that need to be removed.

SUMMARY OF THE INVENTION

The invention involves a catalyst composite with a layered composition comprising an inner core, an outer layer bonded to the inner core, the outer layer comprising one or more transition alumina with at least two diffraction angle peaks between 32.0° and 70.0° 2θ, wherein a first diffraction angle peak in that range is at 32.7±0.4° 2θ, a second diffraction angle peak is at 50.8±0.4° 2θ and having a thickness of less than about 100 microns and having uniformly dispersed thereon at least one platinum group metal and at least one promoter metal and having a concentration of the at least one platinum group metal of from about 0.00006 to 0.0005 gram of the platinum group metal on an elemental basis per meter square surface area of the outer layer, the layered composition further having dispersed thereon at least one modifier metal, the inner core and the outer refractory inorganic oxide being different materials.

In a broad embodiment, this invention is a hydrocarbon dehydrogenation process comprising contacting a hydrocarbon stream with a layered composition under dehydrogenation conditions to give a dehydrogenated product, the layered composition comprising an inner core, an outer layer bonded to the inner core, the outer layer comprising one or more transition alumina with at least two diffraction angle peaks between 32.0° and 70.0° 2θ, wherein a first diffraction angle peak in that range is at 32.7±0.4° 2θ, a second diffraction angle peak is at 50.8±0.4° 2θ, and having a thickness of less than about 100 microns and having uniformly dispersed thereon said platinum catalyst and at least one promoter metal and having a concentration of the platinum catalyst of from about 0.00006 to 0.0005 gram of the platinum group metal on an elemental basis per meter square surface area of the outer layer, the layered composition further having dispersed thereon at least one modifier metal, the inner core and the outer refractory inorganic oxide being different materials, the layered composition further having a loading of the at least one platinum group metal of from about 0.0010 to about 0.0060 gram of the platinum group metal on an elemental basis per cubic centimeter of the layered composition.

BRIEF DESCRIPTION OF THE DRAWING

The FIGURE shows the x-ray diffraction of the material prepared in Examples 1-3 and of two different forms of alumina.

DETAILED DESCRIPTION OF THE INVENTION

The present invention relates to a dehydrogenation process that uses layered catalyst composition. The layered catalyst composition comprises an inner core composed of a material which has substantially lower adsorptive capacity for catalytic metal precursors, relative to the outer layer. Some of the inner core materials are also not substantially penetrated by liquids, e.g., metals including but not limited to aluminum, titanium and zirconium. Examples of the inner core material include, but are not limited to, refractory inorganic oxides, silicon carbide and metals. Examples of refractory inorganic oxides include without limitation alpha alumina, theta alumina, cordierite, zirconia, titania and mixtures thereof. A preferred inorganic oxide is alpha alumina.

These materials which form the inner core can be formed into a variety of shapes such as pellets, extrudates, spheres or irregularly shaped particles although not all materials can be formed into each shape. Preparation of the inner core can be done by means known in the art such as oil dropping, pressure molding, metal forming, pelletizing, granulation, extrusion, rolling methods and marumerizing. A spherical inner core is preferred. The inner core, whether spherical or not, has an effective diameter of about 0.05 mm to about 5 mm and preferably from about 0.8 mm to about 3 mm. For a non-spherical inner core, effective diameter is defined as the diameter the shaped article would have if it were molded into a sphere. Once the inner core is prepared, it is calcined at a temperature of about 400° C. to about 1500° C.

The inner core is now coated with a layer of a refractory inorganic oxide which is different from the inorganic oxide which may be used as the inner core and will be referred to as the outer refractory inorganic oxide. This outer refractory oxide is one which has good porosity, has a surface area of at least 50 m²/g, and preferably at least 150 m²/g, an apparent bulk density of about 0.2 g/ml to about 1.0 g/ml and is chosen from the group consisting of gamma alumina, delta alumina, eta alumina, theta alumina, silica/alumina, zeolites, non-zeolitic molecular sieves (NZMS), titania, zirconia and mixtures thereof. It should be pointed out that silica/alumina is not a physical mixture of silica and alumina but means an acidic and amorphous material that has been cogelled or coprecipitated. This term is well known in the art, see e.g., U.S. Pat. Nos. 3,909,450; 3,274,124; and 4,988,659, all of which are incorporated by reference. Examples of zeolites include, but are not limited to, zeolite Y, zeolite X, zeolite L, zeolite beta, ferrierite, MFI, mordenite and erionite. Non-zeolitic molecular sieves (NZMS) are those molecular sieves which contain elements other than aluminum and silicon and include silicoaluminophosphates (SAPOs) described in U.S. Pat. No. 4,440,871, ELAPOs described in U.S. Pat. No. 4,793,984, MeAPOs described in U.S. Pat. No. 4,567,029.

The layer is applied by forming a slurry of the outer refractory oxide and then coating the inner core with the slurry by means well known in the art. Slurries of inorganic oxides can be prepared by means well known in the art which usually involve the use of a peptizing agent. For example, any of the transitional aluminas can be mixed with water and an acid such as nitric, hydrochloric, or sulfuric to give a slurry. Alternatively, an aluminum sol can be made by for example, dissolving aluminum metal in hydrochloric acid and then mixing the aluminum sol with the alumina powder.

It is also required that the slurry contain an organic bonding agent which aids in the adhesion of the layer material to the inner core. Examples of this organic bonding agent include but are not limited to polyvinyl alcohol (PVA), hydroxy propyl cellulose, methyl cellulose and carboxy methyl cellulose. The amount of organic bonding agent which is added to the slurry will vary considerably from about 0.1 wt-% to about 3 wt-% of the slurry. How strongly the outer layer is bonded to the inner core can be measured by the amount of layer material lost during an attrition test, i.e., attrition loss. Loss of the second refractory oxide by attrition is measured by agitating the catalyst, collecting the fines and calculating an attrition loss. It has been found that by using an organic bonding agent as described above, the attrition loss is less than about 10 wt-% of the outer layer. Finally, the thickness of the outer layer varies from about 5 to about 150 microns. One micron equals 10' meter.

Depending on the particle size of the outer refractory inorganic oxide, it may be necessary to mill the slurry in order to reduce the particle size and simultaneously give a narrower particle size distribution. This can be done by means known in the art such as ball milling for times of about 30 minutes to about 5 hours and preferably from about 1.5 to about 3 hours. It has been found that using a slurry with a narrow particle size distribution improves the bonding of the outer layer to the inner core.

Without wishing to be bound by any particular theory, it appears that bonding agents such as PVA aid in making an interlocking bond between the outer layer material and the inner core. Whether this occurs by the PVA reducing the surface tension of the core or by some other mechanism is not clear. What is clear is that a considerable reduction in loss of the outer layer by attrition is observed.

The slurry may also contain an inorganic bonding agent selected from an alumina bonding agent, a silica bonding agent or mixtures thereof. Examples of silica bonding agents include silica sol and silica gel, while examples of alumina bonding agents include alumina sol, boehmite and aluminum nitrate. The inorganic bonding agents are converted to alumina or silica in the finished composition. The amount of inorganic bonding agent varies from about 2 to about 15 wt-% as the oxide and based on the weight of the slurry.

Coating of the inner core with the slurry can be accomplished by means such as rolling, dipping, spraying, etc. One preferred technique involves using a fixed fluidized bed of inner core particles and spraying the slurry into the bed to coat the particles evenly. The thickness of the layer can vary considerably, but usually is from about 40 to about 150 microns. It should be pointed out that the optimum layer thickness depends on the choice of the outer refractory oxide. Once the inner core is coated with the layer of outer refractory inorganic oxide, the resultant layered support is dried at a temperature of about 100° C. to about 320° C. for a time of about 1 to about 24 hours and then calcined at a temperature of about 400° C. to about 1100° C. for a time of about 0.5 to about 10 hours to effectively bond the outer layer to the inner core and provide a layered catalyst support. Of course, the drying and calcining steps can be combined into one step.

When the inner core is composed of a refractory inorganic oxide (inner refractory oxide), it is necessary that the outer refractory inorganic oxide be different from the inner refractory oxide. Additionally, it is required that the inner refractory inorganic oxide have a substantially lower adsorptive capacity for catalytic metal precursors relative to the outer refractory inorganic oxide.

Having obtained the layered catalyst support, catalytic metals can be dispersed on the layered support by means known in the art. Thus, a platinum group metal, a promoter metal and a modifier metal can be dispersed on the outer layer. The platinum group metals include platinum, palladium, rhodium, iridium, ruthenium and osmium. Promoter metals are selected from the group consisting of tin, germanium, rhenium, gallium, bismuth, lead, indium, cerium, zinc and mixtures thereof, while modifier metals are selected from the group consisting of alkali metals, alkaline earth metals and mixtures thereof.

These catalytic metal components can be deposited on the layered support in any suitable manner known in the art. One method involves impregnating the layered support with a solution (preferably aqueous) of a decomposable compound of the metal or metals. By decomposable is meant that upon heating the metal compound is converted to the metal or metal oxide with the release of byproducts. Illustrative of the decomposable compounds of the platinum group metals are chloroplatinic acid, ammonium chloroplatinate, bromoplatinic acid, dinitrodiamino platinum, sodium tetranitroplatinate, rhodium trichoride, hexa-amminerhodium chloride, rhodium carbonylchloride, sodium hexanitrorhodate, chloropalladic acid, palladium chloride, palladium nitrate, diamminepalladium hydroxide, tetraamminepalladium chloride, hexachloroiridate (IV) acid, hexachloroiridate (III) acid, ammonium hexachloroiridate (III), ammonium aquohexachloroiridate (IV), ruthenium tetrachloride, hexachlororuthenate, hexa-ammineruthenium chloride, osmium trichloride and ammonium osmium chloride. Illustrative of the decomposable promoter metal compounds are the halide salts of the promoter metals. A preferred promoter is tin and preferred decomposable compounds are stannous chloride or stannic chloride.

The alkali and alkaline earth metals which can be used as modifier metals in the practice of this invention include lithium, sodium, potassium, cesium, rubidium, beryllium, magnesium, calcium, strontium and barium. Preferred modifier metals are lithium, potassium, sodium and cesium with lithium and sodium being especially preferred. Illustrative of the decomposable compounds of the alkali and alkaline earth metals are the halide, nitrate, carbonate or hydroxide compounds, e.g., potassium hydroxide, lithium nitrate.

All three types of metals can be impregnated using one common solution or they can be sequentially impregnated in any order, but not necessarily with equivalent results. A preferred impregnation procedure involves the use of a steam-jacketed rotary dryer. The support is immersed in the impregnating solution containing the desired metal compound contained in the dryer and the support is tumbled therein by the rotating motion of the dryer. Evaporation of the solution in contact with the tumbling support is expedited by applying steam to the dryer jacket. The resultant composite is allowed to dry under ambient temperature conditions or dried at a temperature of about 80° C. to about 350° C., followed by calcination at a temperature of about 200° C. to about 700° C. for a time of about 1 to about 4 hours, thereby converting the metal compound to the metal or metal oxide. It should be pointed out that for the platinum group metal compound, it is preferred to carry out the calcination at a temperature of about 400° C. to about 700° C.

In one method of preparation, the promoter metal is first deposited onto the layered support and calcined as described above and then the modifier metal and platinum group metal are simultaneously dispersed onto the layered support by using an aqueous solution which contains a compound of the modifier metal and a compound of the platinum group metal. The support is impregnated with the solution as described above and then calcined at a temperature of about 400° C. to about 700° C. for a time of about 1 to about 4 hours.

An alternative method of preparation involves adding one or more of the metal components to the outer refractory oxide prior to applying it as a layer onto the inner core. For example, a decomposable salt of the promoter metal, e.g., tin (IV) chloride can be added to a slurry composed of gamma alumina and aluminum sol. Further, either the modifier metal or the platinum group metal or both can be added to the slurry. Thus, in one method, all three catalytic metals are deposited onto the outer refractory oxide prior to depositing the second refractory oxide as a layer onto the inner core. Again, the three types of catalytic metals can be deposited onto the outer refractory oxide powder in any order although not necessarily with equivalent results.

Another method of preparation involves first impregnating the promoter metal onto the outer refractory oxide and calcining as described above. Next, a slurry is prepared (as described above) using the outer refractory oxide containing the promoter metal and applied to the inner core by means described above. Finally, the modifier metal and platinum group metal are simultaneously impregnated onto the layered composition which contains the promoter metal and calcined as described above to give the desired layered catalyst.

As a final step in the preparation of the layered catalyst composition, the catalyst composition is reduced under hydrogen or other reducing atmosphere in order to ensure that the platinum group metal component is in the metallic state (zero valent). Reduction is carried out at a temperature of about 100° C. to about 650° C. for a time of about 0.5 to about 10 hours in a reducing environment, preferably dry hydrogen. The state of the promoter and modifier metals can be metallic (zero valent), metal oxide or metal oxychloride.

The layered catalyst composition can also contain a halogen component which can be fluorine, chlorine, bromine, iodine or mixtures thereof with chlorine and bromine preferred. This halogen component is present in an amount of 0.03 to about 1.5 wt-% with respect to the weight of the entire catalyst composition. The halogen component can be applied by means well known in the art and can be done at any point during the preparation of the catalyst composition although not necessarily with equivalent results. It is preferred to add the halogen component after all the catalytic components have been added either before or after treatment with hydrogen.

Although in the preferred embodiments all three metals are uniformly distributed throughout the outer layer of outer refractory oxide and substantially present only in the outer layer, it is also within the bounds of this invention that the modifier metal can be present both in the outer layer and the inner core. This is owing to the fact that the modifier metal can migrate to the inner core, when the core is other than a metallic core.

Although the concentration of each metal component can vary substantially, it is desirable that the platinum group metal be present in a concentration of about 0.01 to about 5.0 weight percent on an elemental basis of the entire weight of the catalyst and preferably from about 0.05 to about 2.0 wt-%. The promoter metal is present in an amount from about 0.01 to about 5.0 wt.-% of the entire catalyst while the modifier metal is present in an amount from about 0.01 to about 5 wt-% of the entire catalyst. Finally, the atomic ratio of the platinum group metal to promoter metal varies from about 0.05 to about 5. In particular when the promoter metal is tin, the atomic ratio is from about 0.1:1 to about 5:1 and preferably from about 0.5:1 to about 3:1. When the promoter metal is germanium the ratio is from about 0.25:1 to about 5:1 and when the promoter metal is rhenium, the ratio is from about 0.05:1 to about 2.75:1.

When the platinum group metal is platinum, this concentration is from about 0.01 to about 5.0 wt-% of platinum on an elemental basis and based on the weight of the outer layer. For a given concentration of the platinum group metal in the outer layer, there is a preferred atomic ratio of the platinum group metal to the promoter metal. For example, when the platinum concentration is between about 0.5 and about 3 wt-% of platinum on an elemental basis and based on the weight of the outer layer, the preferred atomic ratio of platinum to tin is from between about 0.5:1 to about 1.3:1, increasing as the platinum concentration increases. When the platinum group metal is platinum, this loading is from about 0.0010 to about 0.0060 gram of platinum on an elemental basis per cubic centimeter of catalyst.

In addition, the layered catalyst for use in the process of this invention has a critical concentration of the platinum group metal in the outer layer. This concentration is generally from 0.00006 to 0.0005 gram of the platinum group metal on an elemental basis per meter square surface area of the outer layer. A higher concentration of platinum group loading per unit surface area is preferred. The higher concentration can be made by having a thinner outer layer thickness and/or an alumina phase with lower surface area. In general, the transition alumina, namely delta and theta, have lower surface area than gamma alumina. Consequently, the platinum group concentration per meter square surface area of the outer delta and/or theta alumina layer is higher than that on gamma alumina with the same outer layer thickness. The outer layer of the layered catalyst has larger pore size with the delta and/or theta alumina, which results in a minimizing of the production of aromatic compounds.

The surface area of the alumina support may be measured by nitrogen adsorption as per BET surface area measurement method. For nitrogen adsorption BET measuring device ASAP 2010 from Micromeritics is used and multipoint BET measurement technique of DIN 66131 is used. A sample amount in the range of 0.1 g to 1.0 g may be used. For surface area measurement, 5 measurement points or more can be taken within a relative pressure range (P/PO) of from 0.05 to 0.25 of the adsorption isotherm. In an embodiment, the alumina outer layer t has a surface area greater than about 70 m$^2$/g or greater than about 80 m$^2$/g or greater than about 90 m$^2$/g. In an exemplary embodiment, the alumina outer layer has a surface area from about 70 m$^2$/g to about 170 m$^2$/g.

The alumina outer layer may comprise essentially delta and/or theta alumina. By "essentially delta and/or theta alumina", it is meant that the alumina outer layer comprises delta and/or theta alumina in an amount greater than about 99 weight percent, or greater than about 97 weight percent, or greater than about 95 weight percent. The alumina crystallites of the alumina outer layer may comprise 100% delta and/or theta alumina crystallites.

The delta and/or theta alumina form of crystalline alumina may be produced from the alumina precursor by closely controlling the maximum calcination temperature experienced by the layered catalyst. Any suitable alumina precursor may be used for producing the alumina outer layer of the present disclosure. In one embodiment, the alumina precursor may be boehmite. Instead of typical gamma alumina conversion at a temperature of 500° C. to 700° C., applicants have found that to produce the delta and/or theta alumina outer layer, the calcination temperature should be tightly controlled to be from about 750° C. to about 1100° C. or about 800° C. to about 1050° C. Such calcination temperatures produce alumina outer layer comprising delta and/or theta alumina crystallites. Also, such calcination temperatures provide a delta and/or theta alumina outer layer having a surface area greater than about 70 m$^2$/g, or greater than about 80 m$^2$/g, or greater than about 90 m$^2$/g. In an exemplary embodiment, an alumina precursor may be calcined for a time from about 10 minutes to about 240 minutes at a temperature from about 750° C. to about 1100° C. to produce the alumina outer layer comprising delta and/or theta alumina. It is known in the literature (Alumina properties. Technical Paper No. 10. 2$^{nd}$ Revision by Newsome, J W; Heiser, H W; Russell, A S; Stumpf, H C) that pore size of alumina is larger when alumina is calcined at higher temperatures. Consequently, the pore size of delta and/or theta alumina outer layer is generally larger than that of gamma alumina.

The concentration of the platinum-group metal in the outer layer can be readily determined in at least three ways. First, the concentration can be computed based on the weight of the ingredients used in preparing the layered catalyst. Second, in the case where the layered catalyst has previously been prepared and the inner refractory inorganic oxide is different from the outer refractory inorganic oxide, then the inner layer refractory inorganic oxide can be separated from the outer refractory inorganic oxide, and the platinum group metal can be separately recovered, by known chemical and/or mechanical methods. Then, the concentration of the weight of the platinum group metal can be determined from the weight of recovered platinum group metal and the weight of recovered inner refractory inorganic oxide. Finally, energy dispersive x-ray spectroscopy or wavelength dispersive spectroscopy (EPMA) using a scanning electron microscope of a sample of the layered catalyst may also be used.

Having obtained the layered catalyst, it can be used in a hydrocarbon dehydrogenation process. Dehydrogenatable hydrocarbons are contacted with the catalyst of the instant invention in a dehydrogenation zone maintained at dehydrogenation conditions. This contacting can be accomplished in a fixed catalyst bed system, a moving catalyst bed system, a fluidized bed system, etc., or in a batch-type operation. A fixed bed system is preferred. In this fixed bed system, the hydrocarbon feed stream is preheated to the desired reaction temperature and then flowed into the dehydrogenation zone containing a fixed bed of the catalyst. The dehydrogenation zone may itself comprise one or more separate reaction zones with heating means there between to ensure that the desired reaction temperature can be maintained at the entrance to each reaction zone. The hydrocarbon may be contacted with the catalyst bed in either upward, downward or radial flow fashion. Radial flow of the hydrocarbon through the catalyst bed is preferred. The hydrocarbon may be in the liquid phase, a mixed vapor-liquid phase or the vapor phase when it contacts the catalyst. Preferably, it is in the vapor phase.

Hydrocarbons which can be dehydrogenated include hydrocarbons with 2 to 30 or more carbon atoms including normal paraffins, isoparaffins, alkylaromatics, naphthenes and olefins. A preferred group of hydrocarbons is the group of normal paraffins with 2 to about 30 carbon atoms. Especially preferred normal paraffins are those having 9 to 16 carbon atoms. Other especially preferred paraffins are monomethyl paraffins and dimethyl paraffins having from 9 to 16 carbon atoms. Each of the aforementioned hydrocarbons may be present alone or in a mixture with one or more of any of the other aforementioned hydrocarbons.

Dehydrogenation conditions include a temperature of from about 400° C. to about 900° C., a pressure of from about 1 to about 1013 kPa and a liquid hourly space velocity (LHSV) of from about 0.1 to about 100 hr$^{-1}$. As used herein, the abbreviation 'LHSV' means liquid hourly space velocity, which is defined as the volumetric flow rate of liquid per hour divided by the catalyst volume, where the liquid volume and the catalyst volume are in the same volumetric units. Generally, for paraffins, the lower the molecular weight, the higher is the temperature required for comparable conversion. The pressure in the dehydrogenation zone is maintained as low as practicable, consistent with equipment limitations, to maximize the chemical equilibrium advantages.

The effluent stream from the dehydrogenation zone generally will contain unconverted dehydrogenatable hydrocarbons, hydrogen and the products of dehydrogenation reactions. These products include desirable olefins and undesirable light ends, aromatics, and others. This effluent stream is typically cooled and passed to a hydrogen separation zone to separate a hydrogen-rich vapor phase from a hydrocarbon-rich liquid phase. Generally, the hydrocarbon-rich liquid phase is further separated by means of either a suitable selective adsorbent, a selective solvent, a selective reaction or reactions or by means of a suitable fractionation scheme. Unconverted dehydrogenatable hydrocarbons are recovered and may be recycled to the dehydrogenation zone. Products of the dehydrogenation reactions are recovered as final products or as intermediate products in the preparation of other compounds. It is necessary to minimize the aromatic formation (or yield) in the dehydrogenation zone so that aromatic concentration does not accumulate in the recycled stream and does not increase the size (and cost) of the selective adsorbent and solvent to remove it.

The novel layered catalyst in this invention affords lower aromatic formation in the dehydrogenation zone. The combination of the platinum group concentration per meter square surface area of the outer layer of 0.00006 to 0.0005 and a composition including delta and/or theta alumina in the outer layer results in the formation of fewer aromatics. While the catalyst activity is still maintained by having substantial active metal platinum loading per cubic centimeter of catalyst or kilogram of the outer layer as described in U.S. Pat. No. 6,756,515 the lower selectivity toward aromatic formation is made possible by the delta and/or theta alumina outer layer with larger average pore size than that in gamma alumina layer. The aromatic products are formed by successive dehydrogenation of desirable olefins. Large alumina pores in the delta and/or theta alumina allow the olefins to diffuse out faster and consequently do not undergo undesirable dehydrogenation to aromatics.

The dehydrogenatable hydrocarbons may be admixed with a diluent material before, while or after being flowed to the dehydrogenation zone. The diluent material may be hydrogen, steam, methane, ethane, carbon dioxide, nitrogen, argon and the like or a mixture thereof. Hydrogen is the preferred diluent. Ordinarily, when hydrogen is utilized as the diluent it is utilized in amounts sufficient to ensure a hydrogen to hydrocarbon mole ratio of about 0.1:1 to about 40:1, with best results being obtained when the mole ratio range is about 1:1 to about 10:1. The diluent hydrogen stream passed to the dehydrogenation zone will typically be recycled hydrogen separated from the effluent from the dehydrogenation zone in the hydrogen separation zone.

Water or a material which decomposes at dehydrogenation conditions to form water such as an alcohol, aldehyde, ether or ketone, for example, may be added to the dehydrogenation zone, either continuously or intermittently, in an amount to provide, calculated on the basis of equivalent water, less than about 10000 weight ppm of the hydrocarbon feed stream, preferably less than 5000 weight ppm, more preferably less than 3000 weight ppm, and possibly even less than 1000 weight ppm. The process of this invention may be operated with no water or material which decomposes to form water added to the dehydrogenation zone.

The following examples are presented in illustration of this invention and are not intended as undue limitations on the generally broad scope of the invention as set out in the appended claims.

Example 1

Alumina spheres were prepared by the well-known oil drop method, which is described in U.S. Pat. No. 2,620,314. This process involves forming an aluminum hydrosol by dissolving aluminum in hydrochloric acid. Hexamethylene tetraamine was added to the sol to gel the sol into spheres when dispersed as droplets into an oil bath maintained at about 93° C. The droplets remained in the oil bath until they set and formed hydrogel spheres. After the spheres were removed from the hot oil, they were pressure-aged at about 135° C. and washed with dilute ammonium hydroxide solution, dried at about 110° C. and calcined at about 650° C. for about 2 hours to give gamma alumina spheres. The calcined alumina was then crushed into a fine powder having a particle size of less than 200 microns.

Next, a slurry was prepared by mixing pseudoboehmite and deionized water and agitated to uniformly distribute the tin component. To this mixture there were added the above prepared alumina powder and a 50% aqueous solution of tin(IV) chloride, and the slurry was ball milled for approximately 240 minutes thereby reducing the maximum particle size to less than 50 microns. This slurry was sprayed onto cordierite cores having an average diameter of about 1.6 mm by using a granulating and coating apparatus to give an outer layer of about 25 microns. At the end of the process, some of the slurry was left which did not coat the cores. This layered spherical support was calcined at about 900° C. in order to convert the pseudoboehmite and gamma alumina in the Outer layer into delta alumina and convert the tin chloride to tin oxide.

The calcined layered support was impregnated with lithium and platinum using a rotary impregnator by contacting the support with an aqueous solution (1:1 solution: support Volume ratio) containing lithium chloride and chloroplatinic acid based on Support weight. The impregnated composite was heated using a rotary impregnator until no solution remained, dried at about 315° C. and calcined at about 540° C. and reduced in hydrogen at about 500° C. The resulting catalyst prepared in this example contained 0.1-0.2 wt-% platinum, 0.1-0.2 wt-% tin, and 0.1-0.2 wt-% lithium with respect to the entire catalyst. These catalysts were identified as Catalyst A, B, C, and D. The properties of catalyst A, B, C and D are summarized in Table 1.

TABLE 1

| Catalyst | Catalyst A | Catalyst B | Catalyst C | Catalyst D |
|---|---|---|---|---|
| Pt wt. % | 0.1-0.2 | 0.1-0.2 | 0.1-0.2 | 0.1-0.2 |
| Sn wt. % | 0.1-0.2 | 0.1-0.2 | 0.1-0.2 | 0.1-0.2 |
| Li wt. % | 0.1-0.2 | 0.1-0.2 | 0.1-0.2 | 0.1-0.2 |
| Layer thickness (um) | 65 | 25 | 65 | 25 |
| Alumina calcination temp (C.) | 600 | 600 | 900 | 900 |
| Alumina in layer | Gamma | Gamma | Delta and/or theta | Delta and/or theta |
| Alumina layer surface area ($m^2/g$) | 203 | 227 | 133 | 156 |
| Grams of Pt in alumina layer/ layer surface area ($g/m^2$) | 0.000041 | 0.000093 | 0.000062 | 0.000135 |
| Mole of Pt in alumina layer/kg of layer (mol/kg) | 0.04 | 0.11 | 0.04 | 0.11 |
| Grams of Platinum in cubic centimeter of catalyst ($g/cm^3$) | 0.0012 | 0.0012 | 0.0012 | 0.0012 |

Example 2

Catalyst A, B, C and D from Example 1 were tested for dehydrogenation activity in a laboratory scale plant. In a 1.27 cm reactor, 5 cc of catalyst was placed and a hydrocarbon feed composed of 8.8-9.3 wt-% n-$C_{10}$, 40.0-41.8 wt-% n-$C_{11}$, 38.6 wt-% n-$C_{12}$, 8.6-10.8 wt-% n-$C_{13}$, 0.3-0.8 wt-% n-$C_{14}$ and 1-1.4 wt-% non-normals was flowed over the catalyst under a pressure of 138 kPa (or 20 psig), a hydrocarbon molar ratio of 4:1, and a liquid hourly space velocity (LHSV) of 28 $hr^{-1}$. The total normal olefin concentration in the product (% TNO) was maintained at 10 wt.-% by adjusting reactor temperature.

Hydrogen and hydrocarbon feed were combined upstream of the reactor to form a combined feed, and the combined feed was vaporized prior to entering the reactor. In this example, the catalyst was tested at water concentrations of 2000 wt-ppm based on the weight of the hydrocarbon in the combined feed. The results of the product liquids collected at 48-hour on stream for the four listed catalysts are presented in the Table 2.

The feed and product streams were analyzed for aromatic content by utilizing a backflush on a high performance liquid chromatography (HPLC) system using n-hexane solvent as the mobile phase and a refractive index detector.

Normal-paraffin conversion %=(normal paraffin in the feed−normal paraffin in product)×100%/Normal paraffin in the feed. Aromatic selectivity %=(aromatic in the product−aromatic in the feed)×100%/Normal-paraffin conversion.

Even though catalyst B showed lower aromatic selectivity than catalyst A. Its aromatic selectivity was still higher than those from Catalyst C and D. Thus, the combination of one or more transition alumina phase (delta and/or theta alumina) in the layer and high Pt density (grams of Pt in alumina layer/layer surface area ($g/m^2$)) enabled the lowest aromatic formation.

TABLE 2

| Sample ID | Aromatic selectivity (%) |
| --- | --- |
| Catalyst A | 2.18 |
| Catalyst B | 1.80 |
| Catalyst C | 1.60 |
| Catalyst D | 1.62 |

Example 3

The structures or the presence of delta alumina for the alumina layers of the four catalysts A, B, C, and D of the present disclosure were determined by X-ray analysis as shown in the Figure. An attempt was made to remove only the outer layer material by placing 1 cc of calcined base into small milling vessel with no milling media. Samples were abraded for various amounts of time depending on how quickly powder from the outer layer was generated. The powders from the four catalytic composites were labeled as sample A, B, C, and D.

The X-ray patterns of sample A, B, C, and D were obtained using standard X-ray powder diffraction techniques. The radiation source was a high-intensity X-ray tube operated at 40 kV and 44 mA. The diffraction pattern from the copper K-alpha radiation was obtained by appropriate computer-based techniques. Flat compressed powder samples were continuously scanned at 8° to 90° 2θ. Interplanar spacings (d) in Angstrom units were obtained from the position of the diffraction peaks expressed as 2θ, where 2θ is the Bragg angle as observed from digitized data. As will be understood by those skilled in the art, the determination of the diffraction angles (2θ) is subject to both human and mechanical error, which in combination can impose an uncertainty of about ±0.4° 2θ on each reported value of 2θ.

SPECIFIC EMBODIMENTS

While the following is described in conjunction with specific embodiments, it will be understood that this description is intended to illustrate and not limit the scope of the preceding description and the appended claims.

A catalyst composite is provided with a layered composition comprising an inner core, an outer layer bonded o the inner core, the outer layer comprising one or more transition alumina with at least two diffraction angle peaks between 32.0° and 70.0° 2θ, wherein a first diffraction angle peak in that range is at 32.7±0.4° 2θ, a second diffraction angle peak is at 50.8±0.4° 2θ and having a thickness of less than about 100 microns and having uniformly dispersed thereon at least one platinum group metal and at least one promoter metal and having a concentration of the at least one platinum group metal of from about 0.00006 to 0.0005 gram of the platinum group metal on an elemental basis per meter square surface area of the outer layer, the layered composition further having dispersed thereon at least one modifier metal, the inner core and the outer refractory inorganic oxide being different materials. An embodiment of the invention is one, any or all of prior embodiments in this paragraph up through the first embodiment in this paragraph wherein the X-ray diffraction pattern has at least 2 peaks and/or shoulders between about 43±0.4° to about 49±0.4° 2θ. An embodiment of the invention is one, any or all of prior embodiments in this paragraph up through the first embodiment in this paragraph wherein the outer layer has a thickness of between about 5-65 microns. The catalyst composite of claim 1 wherein the outer layer has a thickness of between about 5-39 microns. An embodiment of the invention is one, any or all of prior embodiments in this paragraph up through the first embodiment in this paragraph wherein the alumina in the outer layer has a surface area of 70-170 $m^2/g$. The catalyst composite of claim 1 wherein the alumina in the outer layer has a surface area of 80-130 $m^2/g$. An embodiment of the invention is one, any or all of prior embodiments in this paragraph up through the first embodiment in this paragraph wherein the alumina in the outer layer has a surface area of 90-110 $m^2/g$. An embodiment of the invention is one, any or all of prior embodiments in this paragraph up through the first embodiment in this paragraph wherein the inner core is selected from the group consisting of alpha alumina, metals, theta alumina, silicon carbide, cordierite, zirconia, titania and mixtures thereof. An embodiment of the invention is one, any or all of prior embodiments in this paragraph up through the first embodiment in this paragraph wherein the platinum group metal is selected from the group consisting of platinum, palladium, rhodium, iridium, ruthenium, osmium and mixtures thereof. An embodiment of the invention is one, any or all of prior embodiments in this paragraph up through the first embodiment in this paragraph wherein the promoter metal is selected from the group consisting of tin, germanium, rhenium, gallium, bismuth, lead, indium, cerium, zinc and mixtures thereof. An embodiment of the invention is one, any or all of prior embodiments in this paragraph up through the first embodiment in this paragraph wherein the modifier metal is selected from the group consisting of alkali metals, alkaline earth metals and mixtures thereof. An embodiment of the invention is one, any or all of prior embodiments in this paragraph up through the first embodiment in this paragraph wherein the platinum group metal is platinum. An embodiment of the invention is one, any or all of prior embodiments in this paragraph up through the first embodiment in this paragraph wherein the promoter metal is tin. An embodiment of the invention is one, any or all of prior embodiments in this paragraph up through the first embodiment in this paragraph further comprising from about 0.01 weight percent to about 1.0 weight percent the platinum group metal, from about 0.01 weight percent to about 1.0 weight percent the promoter metal, and from about 0.01 weight percent to about 1.0 weight percent the modifier metal.

In another embodiment of the invention is provided a hydrocarbon dehydrogenation process comprising contacting a hydrocarbon stream with a layered composition under dehydrogenation conditions to give a dehydrogenated product, the layered composition comprising an inner core, an outer layer bonded to the inner core, the outer layer comprising one or more transition alumina with at least two diffraction angle peaks between 32.0° and 70.0° 2θ, wherein a first diffraction angle peak in that range is at 32.7±0.4° 2θ, a second diffraction angle peak is at 50.8±0.4° 2θ, and having a thickness of less than about 100 microns and having uniformly dispersed thereon the platinum catalyst and at least one promoter metal and having a concentration of the platinum catalyst of from about 0.00006 to 0.0005 gram of the platinum group metal on an elemental basis per meter square surface area of the outer layer, the layered composition further having dispersed thereon at least one modifier metal, the inner core and the outer refractory inorganic oxide being different materials, the layered composition further having a loading of the at least one platinum group metal of from about 0.0010 to about 0.0060 gram of the platinum group metal on an elemental basis per cubic centimeter of the layered composition. An embodiment of the invention is one, any or all of prior embodiments in this paragraph up through the first embodiment in this paragraph further characterized in that the dehydrogenation conditions comprise a temperature of about 400° C. to about 900° C. and a pressure of about 1 kPa to about 1013 kPa. An embodiment of the invention is one, any or all of prior embodiments in this paragraph up through the first embodiment in this paragraph wherein the hydrocarbon stream comprises at least one C2-C30 hydrocarbon selected from the group consisting of normal paraffins, isoparaffins, alkylaromatics, naphthenes, and olefins. An embodiment of the invention is one, any or all of prior embodiments in this paragraph up through the first embodiment in this paragraph wherein the hydrocarbon stream comprises monomethyl paraffins or dimethyl paraffins. An embodiment of the invention is one, any or all of prior embodiments in this paragraph up through the first embodiment in this paragraph wherein the hydrocarbon stream comprises normal paraffins having 2 to 16 carbon atoms. An embodiment of the invention is one, any or all of prior embodiments in this paragraph up through the first embodiment in this paragraph wherein the hydrocarbon stream comprises a C9-C16 hydrocarbon selected from the group consisting of normal paraffins, monomethyl paraffins, and dimethyl paraffins.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A catalyst composite with a layered composition comprising an inner core, an outer layer bonded to the inner core, the outer layer comprising one or more transition alumina with at least two diffraction angle peaks between 32.0° and 70.0° 2θ, wherein a first diffraction angle peak in that range is at 32.7±0.4° 2θ, a second diffraction angle peak is at 50.8±0.4° 2θ and having a thickness of less than about 100 microns and having uniformly dispersed thereon at least one platinum group metal and at least one promoter metal and having a concentration of the at least one platinum group metal of from about 0.00006 to 0.0005 gram of the platinum group metal on an elemental basis per meter square surface area of the outer layer, the layered composition further having dispersed thereon at least one modifier metal, the inner core and the outer refractory inorganic oxide being different materials.

2. The catalyst composite of claim 1 wherein the X-ray diffraction pattern has at least 2 peaks and/or shoulders between about 43±0.4° to about 49±0.4° 2θ.

3. The catalyst composite of claim 1 wherein said outer layer has a thickness of between about 5-65 microns.

4. The catalyst composite of claim 1 wherein said outer layer has a thickness of between about 5-39 microns.

5. The catalyst composite of claim 1 wherein said alumina in said outer layer has a surface area of 70-170 m$^2$/g.

6. The catalyst composite of claim 1 wherein said alumina in said outer layer has a surface area of 80-130 m$^2$/g.

7. The catalyst composite of claim 1 wherein said alumina in said outer layer has a surface area of 90-110 m$^2$/g.

8. The catalyst composite of claim 1 wherein the inner core is selected from the group consisting of alpha alumina, metals, theta alumina, silicon carbide, cordierite, zirconia, titania and mixtures thereof.

9. The catalyst composite of claim 1 wherein the platinum group metal is selected from the group consisting of platinum, palladium, rhodium, iridium, ruthenium, osmium and mixtures thereof.

10. The catalyst composite of claim 1 wherein the promoter metal is selected from the group consisting of tin, germanium, rhenium, gallium, bismuth, lead, indium, cerium, zinc and mixtures thereof.

11. The catalyst composite of claim 1 wherein the modifier metal is selected from the group consisting of alkali metals, alkaline earth metals and mixtures thereof.

12. The catalyst composite of claim 1 wherein the platinum group metal is platinum.

13. The catalyst composite of claim 1 wherein the promoter metal is tin.

14. The catalytic composite of claim 1 further comprising from about 0.01 weight percent to about 1.0 weight percent the platinum group metal, from about 0.01 weight percent to about 1.0 weight percent the promoter metal, and from about 0.01 weight percent to about 1.0 weight percent the modifier metal.

* * * * *